United States Patent [19]

Czoch et al.

[11] 4,344,520

[45] Aug. 17, 1982

[54] MONITORING FLOW OF ROD-LIKE ARTICLES

[75] Inventors: Jerzy W. Czoch; Douglas J. W. Seagrove, both of London, England

[73] Assignee: Molins Limited, London, England

[21] Appl. No.: 124,802

[22] Filed: Feb. 26, 1980

Related U.S. Application Data

[63] Continuation of Ser. No. 872,872, Jan. 27, 1978, abandoned.

[30] Foreign Application Priority Data

Feb. 5, 1977 [GB] United Kingdom ................. 4856/77

[51] Int. Cl.³ ................................................ B65G 1/04

[52] U.S. Cl. .................................... 198/347; 198/502; 235/92 V; 250/222 PC; 324/178; 340/674; 356/28; 358/105

[58] Field of Search ............... 198/347, 502, 572, 573, 198/577, 855, 857; 131/21 A, 21 B, 282, 283; 235/92 V; 356/28; 250/222 PC, 223 R; 340/673, 674; 358/105, 106; 324/178

[56] References Cited

U.S. PATENT DOCUMENTS 3,512,662 3/1970 Strydom ........................ 198/572 X
4,220,962 9/1980 Ichida et al. ........................ 358/105

FOREIGN PATENT DOCUMENTS 1320328 6/1973 United Kingdom .

*Primary Examiner*—Robert B. Reeves
*Assistant Examiner*—Douglas D. Watts
*Attorney, Agent, or Firm*—Craig and Antonelli

[57] ABSTRACT

Apparatus for monitoring the flow of a stack of cigarettes in a conveyor system using a television camera tube or light-sensitive detectors positioned adjacent the ends of the cigarettes, preferably in an array or row covering the whole height of the stack, to monitor the formation of the stack and to produce pulse signals representing the articles present. The sensors are scanned by control circuitry which produces control signals in response to the number or speed of articles detected.

34 Claims, 10 Drawing Figures

MONITORING FLOW OF ROD-LIKE ARTICLES

This is a continuation of application Ser. No. 872,872, filed Jan. 27, 1978, now abandoned.

This invention relates to conveyor systems for conveying cigarettes and similar rod-shaped articles in stack formation and is particularly concerned with measuring the flow of the articles at or near a junction between conveyors or between a generally horizontal conveyor and another part of the machine, such as vertical conveyor or a chute. The term "stack formation" in this context refers to a stream having a multilayer thickness though in practice cigarettes do not necessarily form distinct layers but instead form a stack in which the cigarettes (viewed from their ends) are somewhat randomly distributed.

The invention will, for convenience, be described in terms of cigarettes though it should be understood that it is applicable also to other similar rod-like articles, especially cigarette filter rods.

The arrangement of the horizontal conveyor in such a machine is usually such that the articles are prevented from moving sideways across the flow path, but are free to "pile-up" vertically to some extent to accommodate local variations in the flow. Various systems for monitoring the flow conditions at such junctions have previously been proposed. One such system utilises a mechanical sensor comprising a pivoted arm resting directly or indirectly on the top of the accumulation of articles at the junction, and connected to a potentiometer so as to give an electrical output signal indicative of the height of the arm and therefore the accumulation of articles. Another such method uses a light source producing a beam normally incident on a photocell and so arranged that when the height of the accumulation of articles reaches a predetermined level, the beam of light is interrupted so that an output is produced from a detection circuit connected to the photocell.

The mechanical systems have the disadvantage that they are not as reliable as electrical or optical detectors, and must contact the articles, even if indirectly, but the photosensitive systems also suffer from a disadvantage in that they work on a "go/no-go" principle, and are thus only really useful as a means of ensuring that the level does not exceed, or fall below, extreme limits. Thus they cannot be used to provide fine control of the condition of the system. It is therefore an object of the present invention to provide a flow monitoring system which can provide more detailed information about, and therefore more accurate control of, the flow conditions at a junction.

According to the present invention there is provided monitoring apparatus for use with a conveying system of the type hereinbefore described, comprising a scanning device arranged to scan the ends of the cigarettes in a stack so as to determine the number of cigarettes present in a section taken along a vertical line transverse to the direction of movement of the cigarettes, and/or so as to determine their speed of movement. The term "scan" is used herein in its broad sense of to "check" or "examine".

The monitoring apparatus may be arranged to monitor the flow of cigarettes near a junction, or to determine the stacking condition of the cigarettes already in the junction, so that a conveyor carrying cigarettes into and/or out of the junction can be suitably controlled.

Preferably, the monitoring apparatus is supplied with a separate input from each of the points where cigarettes enter or leave the junction so that in the case of a junction comprising two horizontal conveyors and a vertical conveyor, for example, three inputs will be supplied so that the total flow to and from the junction can be monitored.

The apparatus preferably further comprises circuit means connected to the scanning device and arranged to convert the output from the scanning device into electrical signals representative of the total number of articles detected or the packing density of the articles. The circuit means may also be arranged to produce signals indicative of various stacking conditions in the flow path or at the junction. For example, the circuit means may be adapted to aggregate the signals from the different detectors representing the number of articles entering and leaving the junction at different points, to ensure that free movement of the articles is being maintained in the junction.

Preferably, the detector means comprises a television camera tube, such as a vidicon tube. The tube may be fed with a plurality of optical inputs, from different points in the cigarette flow paths near the junction, by optical feeders, such as fiber optic bundles or other image transmitting means, in which case the various inputs will be supplied to different areas of the tube face. The individual signals can then be extracted from the scan of the tube by suitable processing circuitry, or alternatively the scan of the tube may be modified by suitable control circuitry so that it is selectively directed to the areas including the required information. It will be appreciated that such arrangements enable a single television tube to perform the function of a large number of individual detectors or sets of detectors. Alternatively arrays or rows of photosensitive detectors may be substituted for the camera tube.

In use, the occurrence of cigarettes along the monitoring line is reproduced as an electrical output signal from the scan of the television tube, or row of detectors, which will generally comprise a series of roughly shaped pulses each of which represents one detected article. The spacing and distribution of the pulses will of course correspond to that of the articles.

A considerable amount of information about the flow conditions may be extracted from such a signal. For example, if the same monitoring point is scanned repeatedly as the articles pass it, the difference in phase of the successive output signals can be detected to provide an indication of speed of flow.

Some embodiments of the invention will now be described by way of example with reference to the accompanying drawings, in which.

FIG. 4*a* is a partial side elevation of a vertical conveyor carrying cigarettes;

FIGS. 4*b* and 4*c* show various wave forms derived from the detection of cigarettes in FIG. 4*a;*

Figure 6:
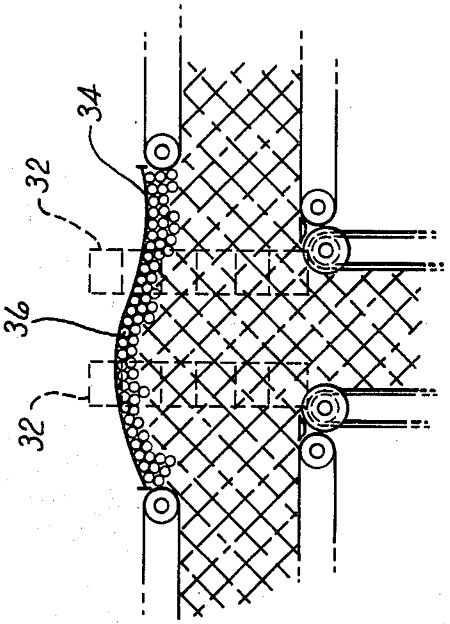
Figure 5:
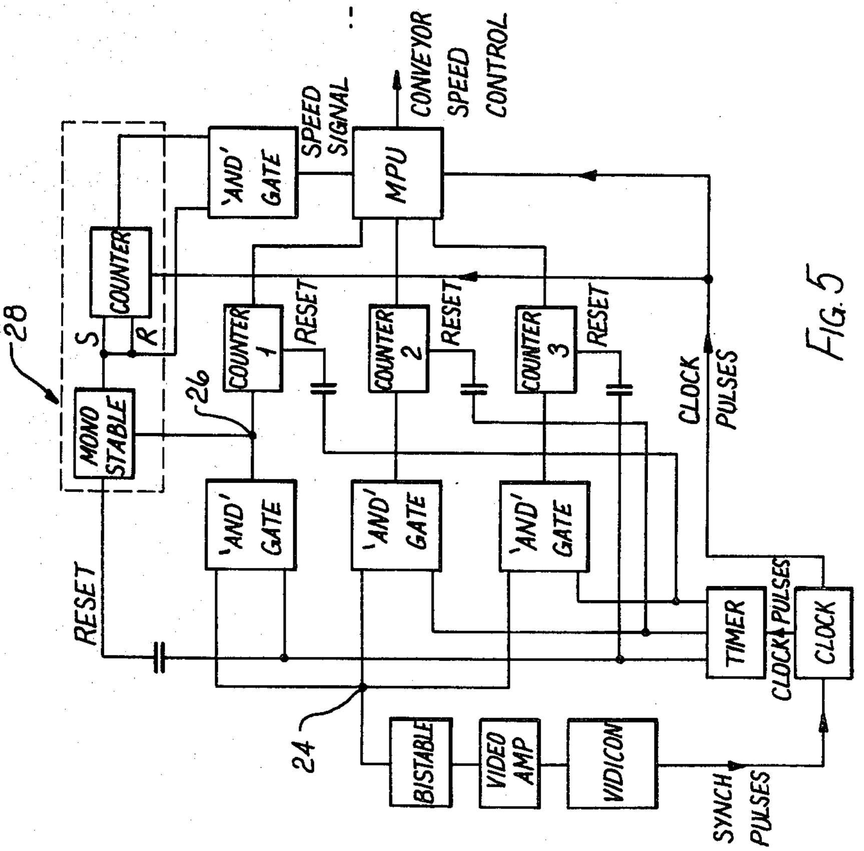
Figure 7:
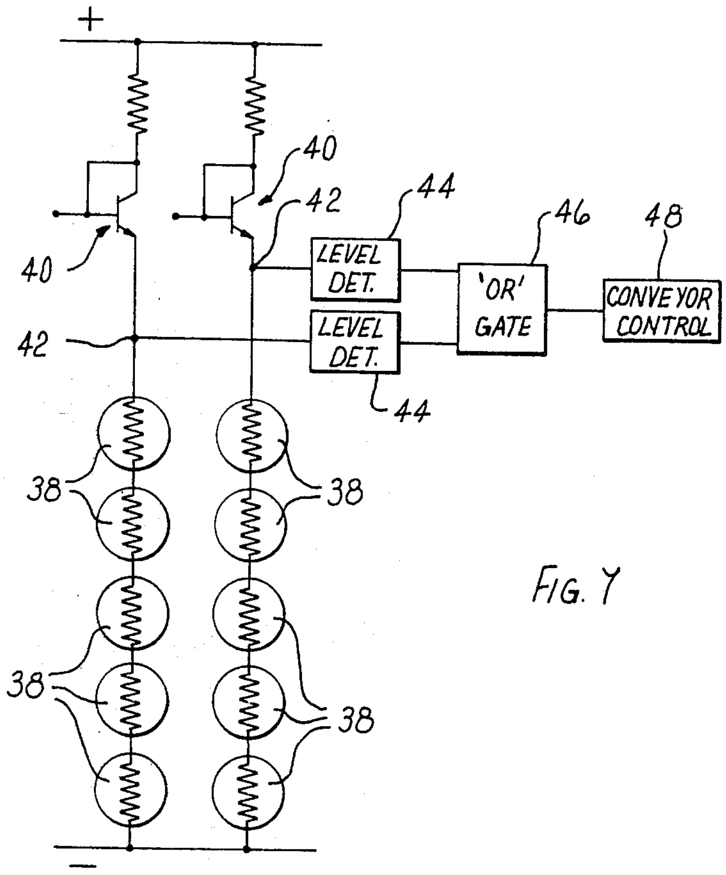
Figure 8:
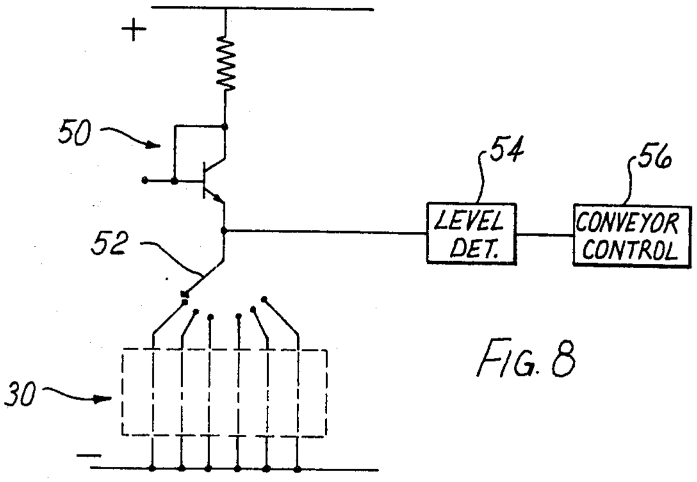

FIG. 5 is a block diagram of a signal processing circuit,

FIG. 6 is a diagrammatic view of a junction incorporating another embodiment of the invention, FIG. 7 is a circuit diagram of the arrangement of FIG. 6; and FIG. 8 is a circuit diagram of a further embodiment.

Figure 1:
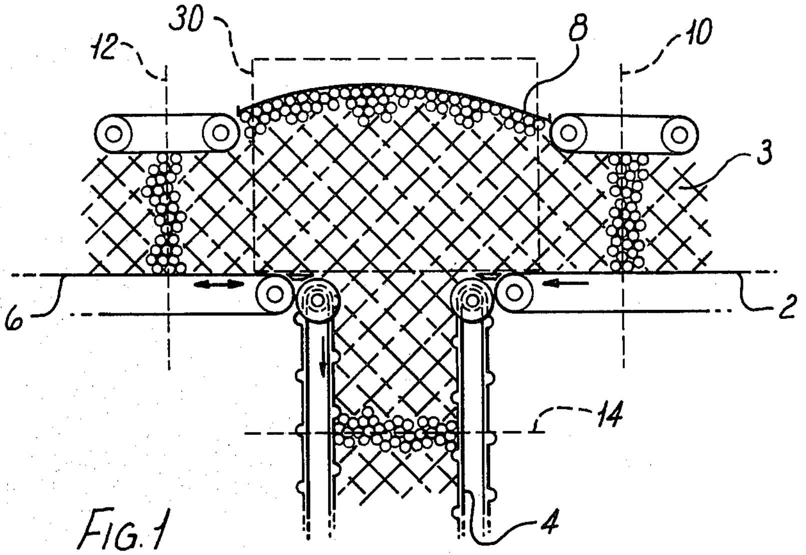
FIG. 1 is a side elevation of a typical junction of three cigarette stack conveyors in a cigarette manufacturing plant.

The invention is concerned with monitoring and control of the flow of cigarettes at a junction of the kind shown in FIG. 1, in which a conveyor 2 carries a stack of cigarettes 3 from a cigarette-making machine, a conveyor 4 carries a stack of cigarettes 5 to a cigarette-packing machine, and a reversible conveyor 6 connects the junction to a cigarette reservoir device, such as a Molins "OSCAR", so that cigarettes can be taken from or supplied to the junction as the need arises.

The cigarettes can accumulate to some extent at the junction under a flexible diaphragm-like device 8, which applies a limited degree of restriction to the stack of cigarettes. In one known control system the condition of the junction is monitored by a sensing member one end of which rests on the top of the device 8. With this arrangement, when an error or deficiency of cigarettes arises at the junction, the sensing member only produces an output after the condition has occurred. It is preferable to be able to anticipate the growth of such a tendency. This can be achieved according to this invention by monitoring the total stacking configuration or distribution, of the cigarettes at the junction (instead of merely the height of the stack) and/or by monitoring the configuration of the cigarettes on the conveyors immediately before they are delivered to the junction or immediately after they have left it.

Figure 2:
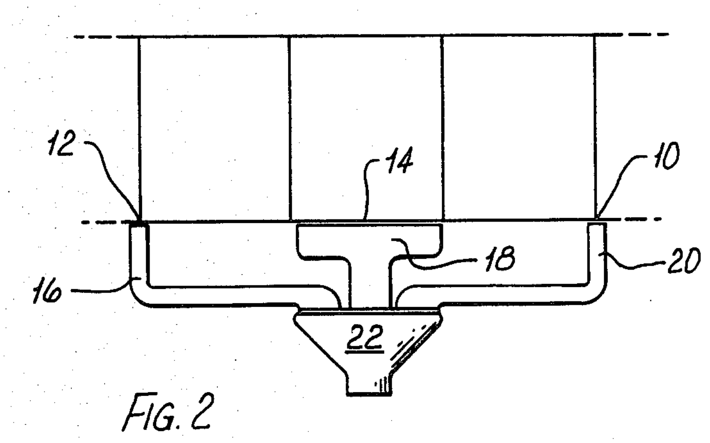
FIG. 2 is a diagrammatic plan view of a junction of the kind shown in FIG. 1 and including a detector installation in accordance with the invention.

Monitoring of the stacking configuration of the cigarettes immediately outside the junction is achieved by arranging suitable detectors along the lines 10, 12 and 14 in FIG. 1. In the illustrated embodiment these "detectors" comprise the ends of optical links 16, 18 and 20, as seen in FIG. 2, (such as fiber-optic light guides) positioned in the regions indicated in the drawing, adjacent the normally white filter ends of the cigarettes. The cigarettes are illuminated in such a way that the filter ends will be sharply picked out against a contrasting background for example by using strong front lighting directed at the ends and a dark background or a well-illuminated background and no front lighting.

Because of the sharp contrast between the cigarette ends and the background it is possible to utilise the characteristics of a vidicon tube to produce quite sharp output signals from the tube, representing the relative positions of images of cigarettes encountered during a scan.

Figure 3:
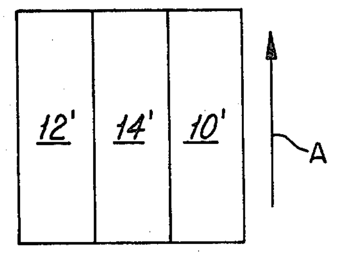
FIG. 3 is a diagrammatic view of a television camera tube face.

The images of the different monitoring lines 10, 12 and 14 are transmitted via the light guides 16, 18 and 20, respectively, to corresponding areas 10′, 12′, 14′ of the tube face as indicated in FIG. 3. The light guides are suitably shaped to re-orient the images where necessary and reduce them in size so as to just fill the tube face, in such a way that they can be scanned sequentially, in the direction indicated by the arrow A in FIG. 3.

Figure 4:
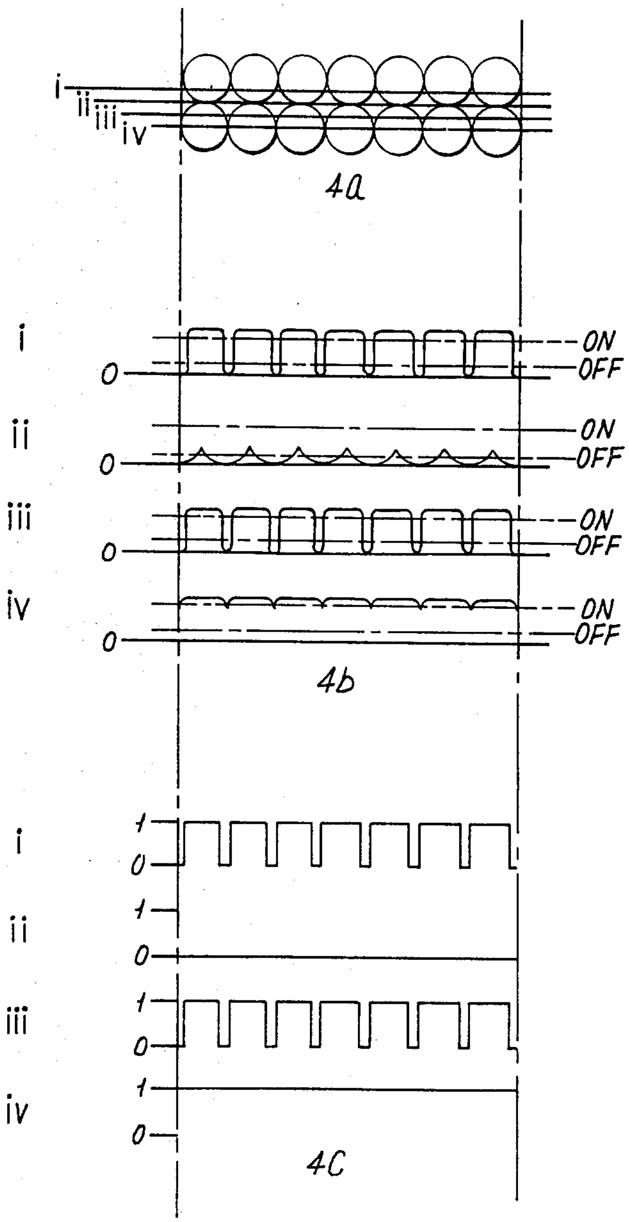

Referring now to FIG. 4, it will be appreciated that even a reasonably regular array of cigarettes, as illustrated diagrammatically in FIG. 4*a*, may give rise to various different waveform outputs from the scanning device, depending on where precisely the array is scanned. For this reason it is necessary to scan the array with a number of parallel sweeps, for example four sweeps as indicated at (i) to (iv) in FIG. 4*a*. These are spaced apart by a distance which corresponds to one quarter of the diameter of the image of a cigarette on the tube face, so that altogether the "width" of each field 10′, 12′ and 14′ is equal to the diameter of one cigarette.

Using three areas of the tube face as shown in FIG. 3, it is thus necessary to arrange the scanning circuitry of the tube to carry out twelve sweeps of the whole area. Since a normal television tube is capable of providing a 625 line scan 25 times per second, it will be appreciated that a whole twelve line scan or raster can be arranged to occur $(625\times25)/12=1200$ times per second approximately. Even if the cigarettes are being fed to or from the junction at a very rapid rate e.g. 4000 per minute, they are usually conveyed in stacks about 12 high, so their actual linear speed is only $4000/(60\times12)=$ approximately 6 cigarettes per second. Thus a complete cigarette will cross the scanned region every 1/6 of a second and will be encountered by the scanning beam 200 times.

Thus the four scans illustrated in FIG. 4*b* occur within a period of about $4/15000=0.0003$ of a second, during which period the cigarettes can be regarded as effectively stationary. The first scan (i) illustrated in the diagram encounters the uppermost line of cigarettes at a point midway between their points of contact with their neighbors in the same line, and their points of contact with the adjacent cigarettes of the lowermost line. Thus, if the brightness level of the output signal is monitored it will vary approximately as a series of pulses, as shown in FIG. 4*b* (i), since the scan will cross alternate light areas (filters) and dark areas (interstices between adjacent filters).

The next scan, whose position is indicated at (ii) in FIG. 4*a*, coincides with the points of contact between the cigarettes in the uppermost row, and those in the lowermost row. Thus the output from this scan is low and shows only very slight increases in level where the scan encounters the points of contact.

Scan (iii) as illustrated will give a similar output to scan (i), because it will cross alternate light and dark areas, and scan (iv) will produce an output which is mostly at a high level, possibly with slight dips at the points of contact between cigarettes, because it encounters the center line of the row.

These signals are now processed digitally using the circuit shown in block diagrammatic form in FIG. 5. The output from a video amplifier in the vidicon camera, which output has the form shown in FIG. 4*b* as explained above, is fed to a bistable circuit whose hysteresis characteristic is indicated by the chain dotted lines superimposed on the waveforms of FIG. 4*b*. The resulting signal at 24 will consist of streams of pulses as indicated at FIG. 4*c* (i) and (iii) interspersed with signals of the kind shown at FIG. 4*c* (ii) and (iv) which are constant '0' and 'I' levels resulting from the brightness level remaining at a relatively constant low or high level, respectively, as explained above in connection with FIG. 4*b*. It will be apparent that under normal flow conditions, i.e. when the cigarettes are reasonably close together, the signal received at point 24 in the circuit as a result of the four scans for each monitored area will ideally include two sets of pulses each corresponding in number to the number of cigarettes in a single row. The possibility of ambiguous signals being produced can be considerably reduced by providing a small capacitance across the input of the bistable, so that switching will only be achieved if the scan moves into the filter area or into a gap area, for a certain minimum time. This ensures that the situation illustrated in FIG. 4*a* (ii), for example, in which the scan moves from one gap to another, across a series of contact points between cigarettes, does not produce an extra stream of pulses.

The output 24 from the bistable circuit is fed to a separate counter for each monitored region, by gating the inputs to the counters in sequence under the control of a timer, which timer also resets each counter before supplying an input to the gate controlling the input of the next counter. The timer is supplied with pulses from a clock which is synchronised with the scan of the camera, so that switching of the gates is precisely synchronised with the movement of the scan from area 10' to area 14', for example, in FIG. 3.

Thus each counter will accumulate a total number of pulses for its respective monitored region, until it receives a reset pulse, at which time it transmits the accumulated total to a microprocessor which allocates it to a memory unit. The process is repeated for each region.

The speed of the cigarettes is monitored in the following way. Connected to the point 26 at the input of each counter is a detection circuit 28, only one of which is shown for clarity. This circuit includes a monostable and is arranged to produce a single short output pulse for each region, coincident with the pulse which indicates the position of the first cigarette detected in this region, i.e. the first pulse to pass the respective gate for that channel when it is switched on by the timer. Because of the high repetition rate of the scan as compared to the rate of movement of the cigarettes, the cigarette in this first position will be successively detected as being apparently in the same place, relative to the first sweep of the scan, for a number of successive scans. The detection circuit 28 is also supplied with clock pulses and includes a counter which is reset by the monostable output pulse, and similarly reset by every subsequent output pulse from that monostable. Thus, it counts the number of clock pulses occurring between the instant of detection of the same cigarette in successive scans. The monostable output pulse and the counter output are also fed to an "AND" gate whose ouput is connected to the microprocessor control unit. Thus, the counter output is fed to the MPU each time the monostable pulse occurs and just prior to each resetting of the counter. The MPU stores each counter output and compares it with the previous counter output each time, and it will be appreciated that when the detected cigarette moves out of the detection path of the scan i.e., when the signal condition of line ii appears at line i in FIG. 4*b*, the time interval since the previous monostable output, i.e. the counter total, will suddenly change as the monostable is triggered at a different time in the scan by the next cigarette row. Such a change therefore indicates the passage of one "row" of cigarettes, and is used by the MPU to calculate, on the basis of the time between detected changes in counter total, the rate of movement of the cigarettes.

The flow of the cigarettes can thus be computed continuously, with the output from the scan as indicated by the individual counters providing an indication of the number of cigarettes in each row at any given instant, and the output from the detection circuit 28 providing confirmation that the cigarettes are in fact moving.

The flow in cigarettes per second for each conveyor is thus obtained by multiplying the number of cigarettes per row, i.e. half the number of pulses per seanned region, by the number of outputs per second from the circuit 28. In the arrangement of FIG. 1, therefore, the flow in conveyor 2 will be continuously compared with that in conveyor 4 and if they are the same, the speed of conveyor 6 will be adjusted (by the microprocessor output to a speed control device) to zero. If more cigarettes are found to be leaving the junction on conveyor 4 than are entering on conveyor 2, (or vice versa) conveyor 6 will be started up to feed cigarettes from the reservoir to the junction until the monitored flow in conveyor 6 is sufficient to make up the deficiency (or remove the surplus).

In addition to, or instead of, scanning the individual conveyors, the system may be arranged to monitor the situation in the junction itself. An information channel will then be provided in the circuit of FIG. 5, to produce a stream of pulses representing the distribution of cigarettes over the whole area of the junction. A speed detection circuit will not be provided for this channel, because the cigarettes will not be moving in a definite single direction.

As before, the scan will consist of four sweeps per cigarette diameter and should, on average, produce about twice as many pulses as there are cigarettes present, so an indication of the capacity of the junction at any instant can be obtained from this output. The sweep of the scan will be vertical and thus the level at any point across the junction can be determined from the number of pulses in each sweep, and the microprocessor can then be arranged to compare the number of pulses at each position with an average expected number. Thus, should any irregularity occur in the distribution at the junction, this will very quickly be detected and can be rectified by starting up the conveyor 6 to supply cigarettes to, or remove them from, the junction.

In order to scan the cigarettes in the junction, it is also envisaged that other detector systems can be used instead of a television camera. For example, a matrix of photo-resistive detectors can be positioned by the junction and the state of each one, i.e. its instantaneous electrical resistance, monitored to provide an indication of the presence of an adjacent cigarette.

The array may be in the form of a rectangular matrix covering most of the area of the junction, as illustrated by the dashed rectangle 30 in FIG. 1 or a matrix in each of the positions 10, 12 and 14 of FIG. 1 or it may be in the form of two vertical rows of detectors positioned at critical regions in the junction, as illustrated diagrammatically at 32 in FIG. 6. In any case the top of the array extends above the normal level of the cigarettes in the junction so as to encompass the whole height of the stack.

Illumination may be provided either from a matching array of sources on the other side of the flow path, so that the amount of light transmitted through the stack is measured, or from a source or sources of general illumination on the same side, so that the amount of light reflected from the filter ends is measured.

In the case of the arrangement comprising two rows 32 (FIG. 6), the detectors are positioned in the regions where undesirable variations in stack formation are most likely to occur. For example as shown in the drawing, a "dip" 34 may occur in the right-hand side of the stack in the junction even though the level on the left-hand side is satisfactory. This kind of situation could easily be missed by a single sensor, such as a mechanical "spoon" since it would only detect the condition at one part of the stack. Clearly a pair of sensors, one at each of the critical regions would improve the chances of detecting such a situation. However, in practice it is found that voids can also occur in the body of the stack so that although the upper level (e.g. at 36) may be correct, the formation of the whole stack may be unsatisfactory. In order to detect such defects in the stack, therefore, a whole row or array of detectors is used.

It will be appreciated that arrays of photosensitive elements can also be scanned to determine their state of illumination. In much the same fashion as the photosensitive surface of a television camera tube is arranged to supply signals to the scanning circuitry of the camera and in fact solid state television cameras have been proposed which use such arrays of elements to pick up the image. Such an array or arrays may therefore be directly substituted for the pick-up systems of FIGS. 1 to 3, each being positioned so as to cover one of the regions 10, 12, 14 or 30, and thus eliminating the necessity for intermediate optical systems 16, 18, 20 etc. Signals corresponding to those of FIG. 4 may thus be produced and processed in the same way, using a circuit like that of FIG. 5 with the substitution of the photosensitive elements and a suitable driver circuit instead of the vidicon camera. In this way detailed signals relating to distribution and speed of the cigarettes can be obtained.

Arrays or rows of photo-sensitive elements may also be used with less sophisticated circuitry to give a simpler and therefore cheaper system which can nevertheless supply useful flow information. For example when each row of detectors comprises photo-resistive elements, the detectors of one row may be connected together in series and fed from a constant current source. The voltage appearing across the row will then provide an analogue signal inversely proportional to the number of cigarettes detected (assuming that the ends are suitably generally illuminated) and this will apply regardless of the position of any voids in the stack. This type of circuit is illustrated diagrammatically in FIG. 7, in which each row of detectors 38 is fed by a power transistor 40 which has its base and collector connected together so that its emitter to which the detectors are connected provides a relatively constant current source. The emitter 42 of each transistor is connected to a level detector 44. When an insufficient number of illuminated cigarette filter ends is detected at one detector row position, the resistance of the respective chain of detectors will be high and therefore the voltage at 42 will be sufficient to cause the respective level detector 44 to give an output to an "or" gate 46, which in turn will actuate conveyor control circuitry 48.

A similar type of circuit arrangement may be used with a large number of rows of detectors, as in the alternative mentioned above forming a rectangular array 30 covering the whole junction. However in this case it is preferable to avoid unnecessary duplication of circuitry, to scan the rows of detectors in turn. An arrangement of this kind is illustrated diagrammatically in FIG. 8. The array of detectors 30 consists of six vertical rows spaced across the junction. These rows are arranged to be sequentially connected to a constant current supply 50, and to monitoring circuitry, by means of a mechanical (or electronic) selector device 52. The voltage across each row is monitored, as in the FIG. 7 embodiment, by a level detector 54 which is connected to a conveyor control circuit. The selector device must be of a "make before break" type to ensure that the level detector input is not allowed to "float" during switching operations, which could lead to spuriously high readings.

Similar arrays of various other kinds of transducers may be used, relying on pneumatic, ultrasonic, fluidic or capacitive effects to provide a logically processable output signal. In order to produce a somewhat simpler system, although with a consequent reduction in the amount of information that can be gathered, it is possible to monitor some parameters of the flow of cigarettes along a conveyor using only one or two photocells. For example, a train of pulses from a single photocell positioned adjacent a central region of the flow of articles, indicating a series of cigarettes passing the position of the photocell, may be used to provide an indication of the speed of flow by measuring the time between successive pulses. Similarly, two photocells may be used which are spaced apart along the direction of the flow, by a known distance, and the waveforms appearing at the two positions can be compared to determine the time taken for the same pattern to be detected first at one cell and then the other. Preferably such cells are arranged to be pulsed with a "carrier" signal of a predetermined a.c. frequency which is then modulated by the cigarette signal pulses. Such an arrangement will not of course give detailed information about the height of the stack and the total number of cigarettes present, but will provide an indication of speed of movement so that if the height is known the total flow can be determined.

We claim:

1. Apparatus for monitoring the flow conditions of cigarettes or similar rod-like articles moving as a multilayer stack in a conveyor stream, comprising sensor means arranged adjacent the ends of said articles for detecting the presence of those articles appearing along at least one line extending substantially over the height of the stack transverse to a direction of movement of said stack; electrical circuit means for repeatedly scanning said sensor means so as to produce an electrical signal representative of the articles appearing along said line; and processor means responsive to said electrical signal for producing an output signal indicative of the quantity of said articles which passes said sensor means per unit time.

2. Apparatus for monitoring the flow conditions of cigarettes or similar rod-like articles moving as a multilayer stack in a conveyor stream, comprising sensor means arranged adjacent the ends of said articles for detecting the presence of those articles appearing above at least one line substantially transverse to a direction of movement of said stack; electrical circuit means for repeatedly scanning said sensor means so as to produce an electrical signal representative of the articles appearing along said line; and processor means responsive to said electrical signal for producing an output signal indicative of the flow conditions of said articles, wherein said sensing means includes a light sensitive sensing device positioned to detect the level of light reflected from the ends of those articles appearing along said line and a light source directed to one side of said stack of articles.

3. Apparatus for monitoring the flow conditions of cigarettes or similar rod-like articles moving as a multilayer stack in a conveyor stream, comprising sensor means arranged adjacent the ends of said articles for detecting the presence of those articles appearing above at least one line substantially transverse to a direction of movement of said stack; electrical circuit means for repeatedly scanning said sensor means so as to produce an electrical signal representative of the articles appearing along said line; and processor means responsive to said electrical signal for producing an output signal indicative of the flow conditions of said articles, wherein said sensor means comprises an array of photosensitive cells, said electrical circuit means comprises means for sequentially energizing said photosensitive cells, and said processor means includes means connected to said array for counting the number of articles detected.

4. Apparatus for monitoring the flow conditions of cigarettes or similar rod-like articles moving as a multilayer stack in a conveyor stream, comprising sensor means arranged adjacent the ends of said articles for detecting the presence of those articles appearing above at least one line substantially transverse to a direction of movement of said stack; electrical circuit means for repeatedly scanning said sensor means so as to produce an electrical signal representative of the articles appearing along said line; and processor means responsive to said electrical signal for producing an output signal indicative of the flow conditions of said articles, wherein said sensor means comprises a plurality of rows of photosensitive cells, each row of cells being arranged along a line substantially transverse to the direction of movement of the stack at that point in the conveyor system; said electrical circuit means comprising means for repeatedly energizing each row of cells at a rate substantially greater than the speed of movement of said article stack; and said processor means including level detector means connected to each row of cells for detecting the electrical level thereof and means responsive to said level detector means for determining both the number of articles detected by each row of cells and the rate of movement thereof.

5. Apparatus for monitoring the flow conditions of a continuous stack of cigarettes or similar rod-like articles moving in a conveyor system, comprising light-sensitive sensor means responsive to a presence of articles, a light source arranged relative to the articles and the sensor means such that a level of illumination of the sensor means changes when articles are present adjacent the sensor means, the sensor means including a television camera tube, and an optical system arranged adjacent the ends of the articles so as to project an image of the articles onto the light-sensitive surface of the tube, electrical circuit means for repeatedly scanning the surface of said tube so as to produce electrical signals representing the articles, and processor means for processing the electrical output signals obtained from said camera tube to produce an electrical signal related to the flow conditions of said moving stack of articles.

6. Apparatus as claimed in claim 5, wherein said processor means includes first means for counting the number of articles detected and second means for determining the rate of movement of said articles.

7. Apparatus as claimed in claim 6, wherein said optical system includes means for projecting an image of those articles appearing along at least one line substantially transverse to a direction of movement of said stack, and wherein said electrical circuit means includes means for controlling the scanning of said tube to provide plural scanning lines parallel to said one line and covering a field related to the diameter of said articles.

8. Apparatus as claimed in claim 7, wherein said optical system projects an image along a plurality of lines forming an array.

9. Apparatus as claimed in claim 7, wherein said optical system projects an image along a plurality of lines disposed at different points in said conveyor system and said electrical circuit means includes further means for controlling the scanning of said tube to provide a separate scanning field for each of said plurality of lines from which an image is projected.

10. Apparatus for monitoring a speed of flow of cigarettes or similar rod-like articles moving in a conveyor system, comprising sensor means arranged adjacent ends of the articles to respond to the presence of articles, electrical circuit means adapted to repeatedly scan the sensor means so as to produce electrical signals representing the articles and processor means to process said electrical signals related to the speed of flow, the electrical circuit means being arranged to scan the sensor means at a higher frequency than an expected rate of movement of the articles, so that each article is detected a number of times in a given position and the frequency of movement of said articles out of said given position provides an indication of a speed of movement of the articles.

11. Apparatus as claimed in claim 10, in which the sensor means includes a television camera tube.

12. Apparatus as claimed in claim 10, in which the sensor means includes a photosensitive element.

13. Apparatus for monitoring flow conditions of cigarettes or similar rod-like articles moving in a conveyor system, comprising sensor means arranged adjacent ends of the articles to respond to the presence of articles, the sensor means includes a pair of photosensitive elements spaced apart along a flow path of the articles by a known distance, electrical circuit means adapted to repeatedly scan the sensor means so as to produce electrical signals representing the articles and processor means to process said electrical signals to produce an electrical signal related to the flow conditions, the electrical circuit means including means for measuring the time interval between detection of the presence of an article by each of the two photosensitive elements so as to provide a measurement of the speed of flow of the articles.

14. Apparatus as claimed in claim 13, wherein said interval measuring means comprises clock pulse generator means for generating a stream of clock pulses, counter means for counting said clock pulses and means for resetting said counter means upon detection of the first article in each scan of said sensor means, said processor means including means responsive to the successive states of said counter means prior to resetting for determining the speed of said articles.

15. Apparatus for monitoring the distribution of rod-like articles at a junction of a conveyor system in which the articles are conveyed in the form of a stack, comprising a plurality of sensors arranged adjacent the ends of the articles so as to monitor the whole height of the stack over at least part of the area of the junction, and electrical circuit means for processing the output of the sensors to provide an indication of the number of articles detected.

16. Apparatus as claimed in claim 15, in which the sensors comprise two spaced-apart vertical rows of detectors.

17. Apparatus as claimed in claim 13, in which the sensors comprise a rectangular matrix of detectors.

18. Apparatus for monitoring the flow of rod-like articles at a junction of at least two conveyors in which the articles are conveyed in the form of a stack, comprising sensor means arranged adjacent the end of at least one of the conveyors, near the junction, for detecting articles along a line extending substantially over the height of the stack transverse to the direction of movement of the stack, signal processing means responsive to the output of said sensor means for producing an output indicative of the quantity of articles on the said conveyor which pass said sensor means per unit time, and control means for another of the conveyors responsive to the output of said signal processing means for controlling the speed and/or direction of movement of the said other conveyor in response to the output of the said sensor means.

19. Apparatus for monitoring the flow of rod-like articles at a junction of at least two conveyors in which the articles are conveyed in the form of a stack, comprising sensor means arranged adjacent the end of at least one of the conveyors, near the junction, for detecting the presence of articles along a line transverse to the direction of movement of the stack, means responsive to the output of said sensor means for monitoring the flow conditions on the said conveyor, and control means for another of the conveyors for altering the speed and/or direction of movement of the said other conveyor in response to the output of the said sensors, wherein said monitoring means includes first means for determining the number of articles detected and second means for determining the rate of movement of the articles.

20. Apparatus for monitoring the flow of rod-like articles at a junction of at least two conveyors in which the articles are conveyed in the form of a stack, comprising sensor means arranged adjacent the end of at least one of the conveyors, near the junction, or detecting the presence of articles along a line transverse to the direction of movement of the stack, means responsive to the output of said sensor means for monitoring the flow conditions on the said conveyor, and control means for another of the conveyors for altering the speed and/or direction of movement of the said other conveyor in response to the output of the said sensors, wherein said sensor means includes a television-type camera tube and optical means for transmitting an image from said stack to said tube.

21. Apparatus as claimed in claim 20, wherein said optical means includes a bundle of optical fibers.

22. Apparatus for monitoring the flow of rod-like articles at a junction of at least two conveyors in which the articles are conveyed in the form of a stack, comprising sensor means arranged adjacent the end of at least one of the conveyors, near the junction, for detecting the presence of articles along a line transverse to the direction of movement of the stack, means responsive to the output of said sensor means for monitoring the flow conditions on the said conveyor, and control means for another of the conveyors for altering the speed and/or direction of movement of the said other conveyor in response to the output of the said sensors, wherein said junction is in communication with at least three conveyors, and wherein said sensor means is responsive to the presence of articles along transverse lines adjacent the ends of two of said conveyors, near the junction, said control means including means for controlling said third conveyor in response to the output of said monitoring means.

23. Apparatus as claimed in claim 22, in which said monitoring means includes means for determining the number of articles detected by said sensor means.

24. Apparatus as claimed in claim 22, in which said monitoring means includes means for determining the rate of movement of the articles.

25. Apparatus for monitoring flow conditions of cigarettes or similar rod-like articles moving in stack formation on a conveyor or in a conveyor system, comprising a plurality of photoresistive cells arranged in series with a constant current source and positioned adjacent ends of the articles to respond to a presence of the articles, and a voltage-sensitive monitoring circuit connected in parallel with the photoresistive cells whereby the voltage monitored is proportional to the number of articles in the stack of the articles.

26. Apparatus for monitoring flow conditions of cigarettes or similar rod-like articles moving on a conveyor or in a conveyor system, comprising a television camera tube and an optical system arranged adjacent the ends of the articles so as to project an image of the articles onto a light-sensitive surface of the camera tube, and electrical circuit means adapted to repeatedly and sequentially scan the light-sensitive surface of the camera tube so as to produce electrical signals representing the articles and to process said electrical signals so as to produce an electrical signal related to the quantity of articles which moves past said camera tube per unit time.

27. Apparatus as claimed in claim 26, in which the electrical circuit means includes scanning circuitry of a television camera, and further comprises signal processing circuitry adapted to produce electrical signal pulses corresponding to articles detected by the optical system.

28. Apparatus for monitoring flow conditions of cigarettes or similar rod-like articles moving on a conveyor or in a conveyor system, comprising a plurality of sensors arranged adjacent ends of the articles to respond to a presence of the articles, and electrical circuit means arranged to scan the sensors at a higher frequency than an expected rate of movement of the articles so that each article is detected a number of times in a given position and the frequency of movement of articles out of said given position provides an indication of a speed of movement of the articles.

29. Apparatus as claimed in claim 28, in which the plurality of sensors comprise light-sensitive elements of a television camera tube.

30. Apparatus as claimed in claim 28, in which the sensors comprise a plurality of photosensitive elements.

31. Apparatus for monitoring flow conditions of cigarettes or similar rod-like articles moving on a conveyor or in a conveyor system, comprising a pair of photosensitive sensor elements spaced apart along a flow path by a known distance and electrical circuit means arranged to sequentially scan the sensor elements to measure a time interval between a detection of an article by each of the two sensor elements so as to provide a measurement of a speed of flow of the articles.

32. A method of controlling the flow of a stack of rod-like articles of the tobacco industry in a conveyor system, the method comprising the steps of repeatedly scanning one side of the stack so as to produce a series of output signals representing the articles in the stack, and comparing the phase of the signals obtained from each scan with those obtained from previous scans to determine the speed of movement of the articles.

33. A method of controlling the flow of rod-like articles of the tobacco industry in a conveyor system, as claimed in claim 32, in which said scanning occurs at first and second points spaced apart along the direction of flow and in which the series of output signals obtained from one of the points is continually compared with the series of output signals from the other point to determine the time taken for articles to travel between the two points.

34. Apparatus for monitoring the flow conditions of a continuous stack of cigarettes or similar rod-like articles moving in a conveyor stream, comprising: light-sensitive sensor means including a television camera tube; and an optical system arranged adjacent the ends of the articles to as to project an image of the articles onto the light-sensitive surface of the camera tube, such that a level of illumination of the sensor means changes when articles are present adjacent the sensor means; electrical circuit means for repeatedly scanning the surface of said camera tube so as to produce electrical signals representing the articles, and processor means for processing the electrical output signals obtained from said camera tube to produce an electrical signal related to the quantity of articles in said moving stack of articles which passes said sensor means per unit time.

* * * * *